US012632078B2

(12) United States Patent
Kim et al.

(10) Patent No.: US 12,632,078 B2
(45) Date of Patent: May 19, 2026

(54) PEDAL SIMULATOR OF VEHICLE

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/022,226

(22) Filed: Jan. 15, 2025

(65) Prior Publication Data

US 2025/0377684 A1 Dec. 11, 2025

(30) Foreign Application Priority Data

Jun. 5, 2024 (KR) ........................ 10-2024-0073806

(51) Int. Cl.
| | |
|---|---|
| *G05G 5/03* | (2008.04) |
| *B60T 7/04* | (2006.01) |
| *B60T 7/06* | (2006.01) |

(52) U.S. Cl.
CPC ............... *G05G 5/03* (2013.01); *B60T 7/042* (2013.01); *B60T 7/06* (2013.01); *B60T 2220/04* (2013.01)

(58) Field of Classification Search
None
See application file for complete search history.

(56) References Cited

U.S. PATENT DOCUMENTS

| | | | | |
|---|---|---|---|---|
| 2020/0353908 | A1* | 11/2020 | Street | B60T 8/4086 |
| 2023/0145896 | A1* | 5/2023 | Kim | G05G 5/03 |
| | | | | 74/560 |
| 2023/0409070 | A1* | 12/2023 | Kim | B60T 7/06 |

FOREIGN PATENT DOCUMENTS

KR 10-2223847 B1 3/2021

* cited by examiner

*Primary Examiner* — Vicky A Johnson
(74) *Attorney, Agent, or Firm* — Morgan, Lewis & Bockius LLP

(57) ABSTRACT

A pedal simulator of a vehicle includes a housing, a piston part movably disposed in the housing, a plurality of damper parts mounted on the piston part, stacked in an axial direction of the piston part, and supported and compressed by the housing and the piston part in response to a movement of the piston part, and an elastic part elastically supporting the piston part inside the housing.

16 Claims, 11 Drawing Sheets

PEDAL SIMULATOR OF VEHICLE

CROSS-REFERENCE TO RELATED APPLICATION

This application claims priority from and the benefit under 35 USC § 119 of Korean Patent Application No. No 10-2024-0073806, filed on Jun. 5, 2024, in the Korean Intellectual Property Office, the entire disclosure of which is incorporated by reference for all purposes.

BACKGROUND

Field

Exemplary embodiments of the present disclosure relate to a pedal simulator of a vehicle, and more particularly, to a pedal simulator of a vehicle capable of providing a braking feel.

Description of the Related Art

Generally, hydraulic systems are applied to electronic brakes. Recently, with the emergence of electric brake devices (brake by wire systems) and autonomous vehicle related technologies, the development of non-hydraulic brake devices is being demanded.

A pedal simulator is a component mounted on an electro mechanical brake (EMB) or electronic booster that provides a driver with a braking feel generated by a conventional mechanical (hydraulic) brake.

Conventional pedal simulators employ elastically deformable dampers to provide a braking feel similar to a hydraulic booster. However, in order to reproduce the pattern of a smooth increase in a pressure rise curve without an inflection point in all braking sections, like the conventional hydraulic booster, a shape of the damper should be complicated, and there is a problem in that a new damper should be developed each time to respond to various requirements. Therefore, there is a need to address the problems.

The background art of the present disclosure is disclosed in Korean Registered Patent No. 10-2223847 (published on Mar. 8, 2021, entitled "Pedal simulator").

SUMMARY

Various embodiments are directed to a pedal simulator of a vehicle capable of responding to various braking feel needs of a pedal simulator.

In addition, various embodiments are directed to a pedal simulator of a vehicle that can be applied regardless of a type and shape of a pedal.

According to an aspect of the present disclosure, there is provided a pedal simulator of a vehicle, which includes a housing, a piston part movably disposed in the housing, a plurality of damper parts mounted on the piston part, stacked in an axial direction of the piston part, and supported and compressed by the housing and the piston part in response to a movement of the piston part, and an elastic part elastically supporting the piston part inside the housing.

The piston part may include a piston body located inside the housing and including a ball, a piston pressing part disposed on one side of the piston body and including a socket rotatably coupled to the ball, and a piston rod provided on the other side of the piston body and passing through the plurality of damper parts.

The piston part may further include a nut screw-coupled to an end portion of the piston rod, and a support plate through which the piston rod passes, which is disposed between the plurality of damper parts and the nut, and which is supported by the elastic part.

The housing may include a first housing including a first hollow in which the piston part is movably accommodated, and a second housing communicating with the first hollow, provided with a second hollow into which the piston rod is inserted, and provided with a support which supports the elastic part.

A diameter of the second hollow may be smaller than a diameter of the first hollow.

The support plate may be provided with a protrusion protruding from an outer surface of the support plate and configured to selectively contact with the support according to movement of the support plate.

The damper part may include a first damper part including a first plate in contact with the piston body and a first damper member which is mounted on the first plate and elastically-deformable, and a second damper part including a second plate in contact with the first damper member and a second damper member which is mounted on the second plate, is in contact with the support plate, and is elastically-deformable.

The first damper member and the second damper member may have different diameters, thicknesses, or hardnesses.

A first hook may be formed to protrude from an outer surface of the first plate, may be inserted into the first damper member, and may hook and fix the first damper member, and a second hook may be formed to protrude from an outer surface of the second plate, may be inserted into the second damper member, and may hook and fix the second damper member.

According to another aspect of the present disclosure, there is provided a pedal simulator of a vehicle, which includes a housing detachably coupled to a pedal part, a piston part movably disposed in the housing, a plurality of damper parts mounted on the piston part, stacked in an axial direction of the piston part, and supported and compressed by the housing and the piston part in response to a movement of the piston part, and an elastic part elastically supporting the piston part inside the housing.

BRIEF DESCRIPTION OF THE DRAWINGS

FIG. 4 is an exploded perspective view illustrating the pedal simulator of a vehicle according to the embodiment of the present disclosure viewed from one direction.

DETAILED DESCRIPTION

Figure 1:
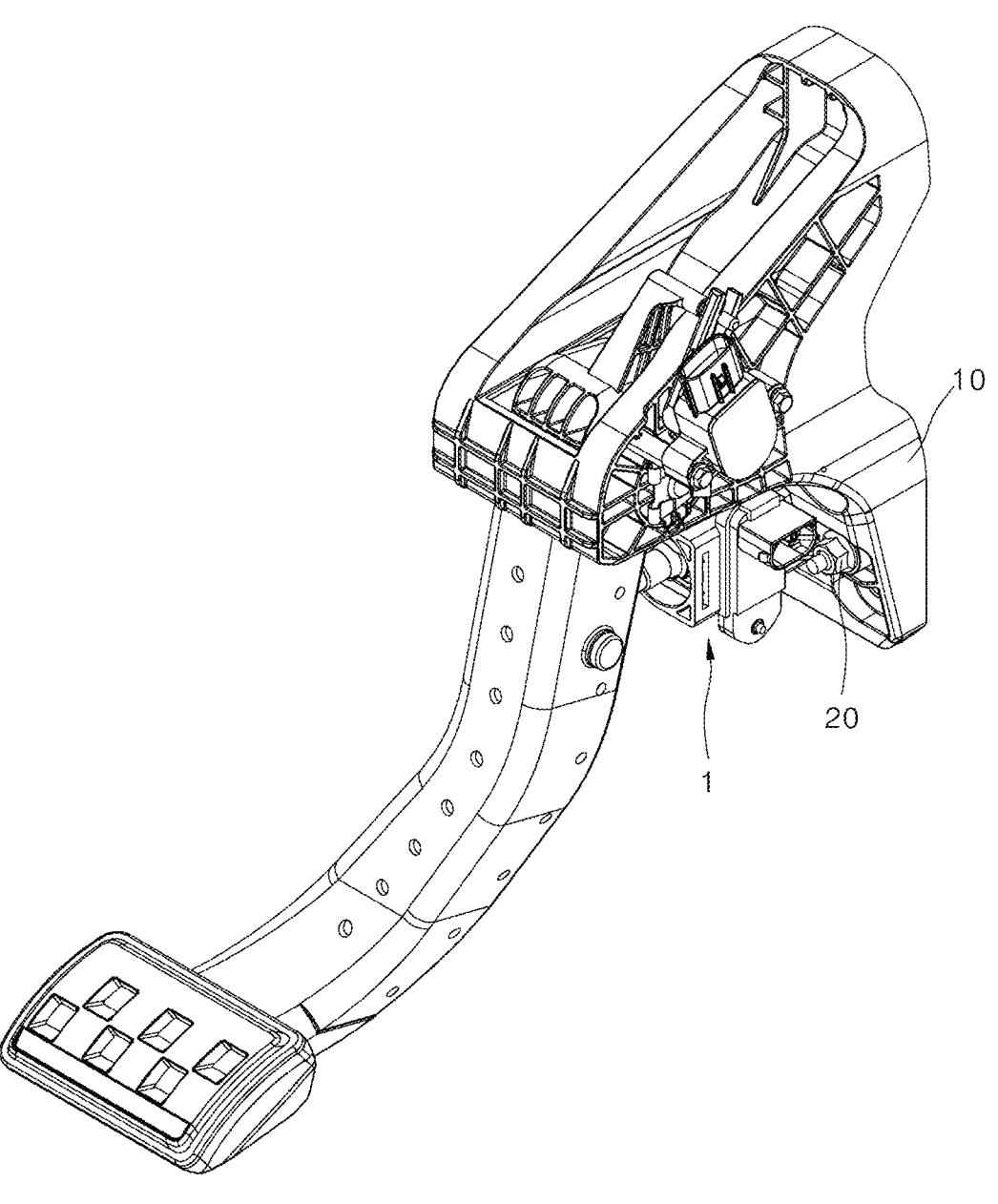
FIG. 1 is a perspective view illustrating a state in which a pedal simulator of a vehicle according to an embodiment of the present disclosure is mounted on a pendant type pedal part.

Hereinafter, an embodiment of a pedal simulator of a vehicle according to the present disclosure will be described with reference to the accompanying drawings. In the following description, thicknesses of lines and sizes of components shown in the drawings may be exaggerated for clarity and convenience of explanation. In addition, the terms used below are defined in consideration of the functions thereof in the present disclosure and may vary depending on the intention of a user or an operator or common practice. Therefore, these terms should be defined on the basis of the contents throughout the present application.

FIG. 1 is a perspective view illustrating a state in which a pedal simulator of a vehicle according to an embodiment of the present disclosure is mounted on a pendant type pedal part.

Referring to FIG. 1, a pedal simulator 1 of a vehicle according to an embodiment of the present disclosure may be detachably mounted regardless of a type and shape of a pedal part 10, such as a pendant type pedal part or an organ type pedal part. Therefore, the pedal simulator 1 of a vehicle according to the embodiment of the present disclosure may be modularized and be easily assembled and mounted on the pedal part 10, such as a pendant type pedal part and an organ type pedal part, thereby enabling product commonization.

The pedal simulator 1 according to the embodiment of the present disclosure may be easily assembled by connecting a bracket 140 provided in a housing 100 to a pendant type pedal part or an organ type pedal part by the medium of a coupling member 20 such as a bolt or a nut.

Figure 2:
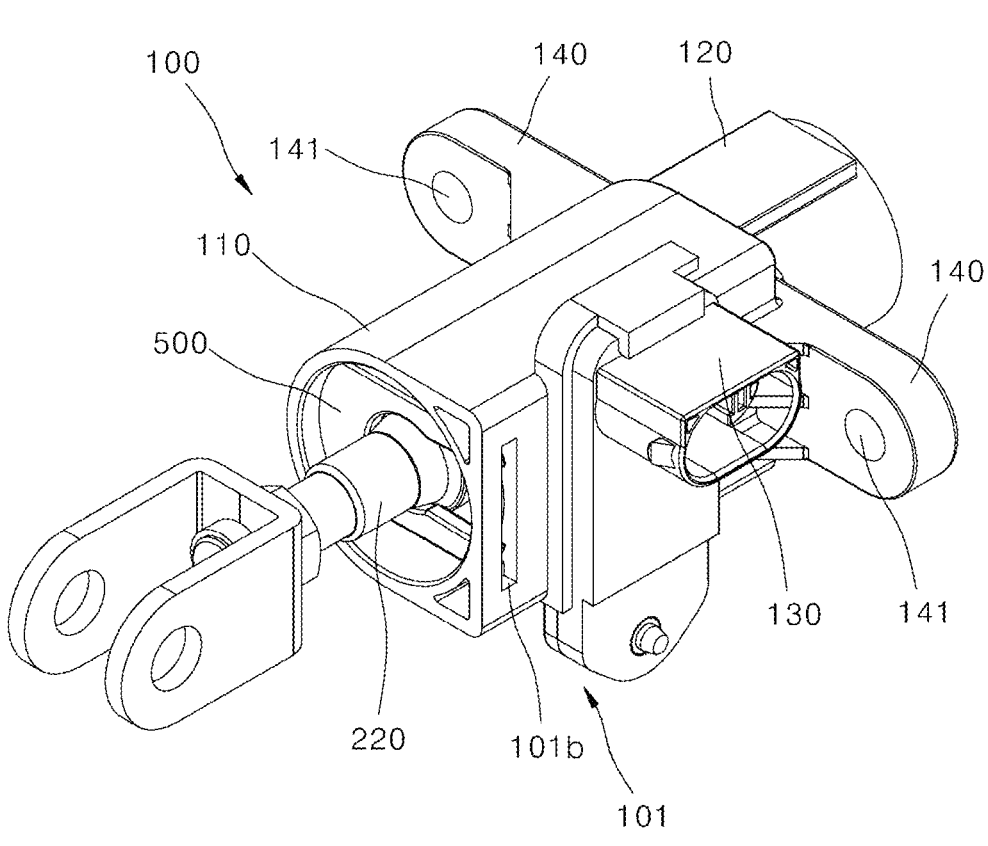
FIG. 2 is a perspective view illustrating the pedal simulator of a vehicle according to the embodiment of the present disclosure viewed from one direction.
Figure 3:
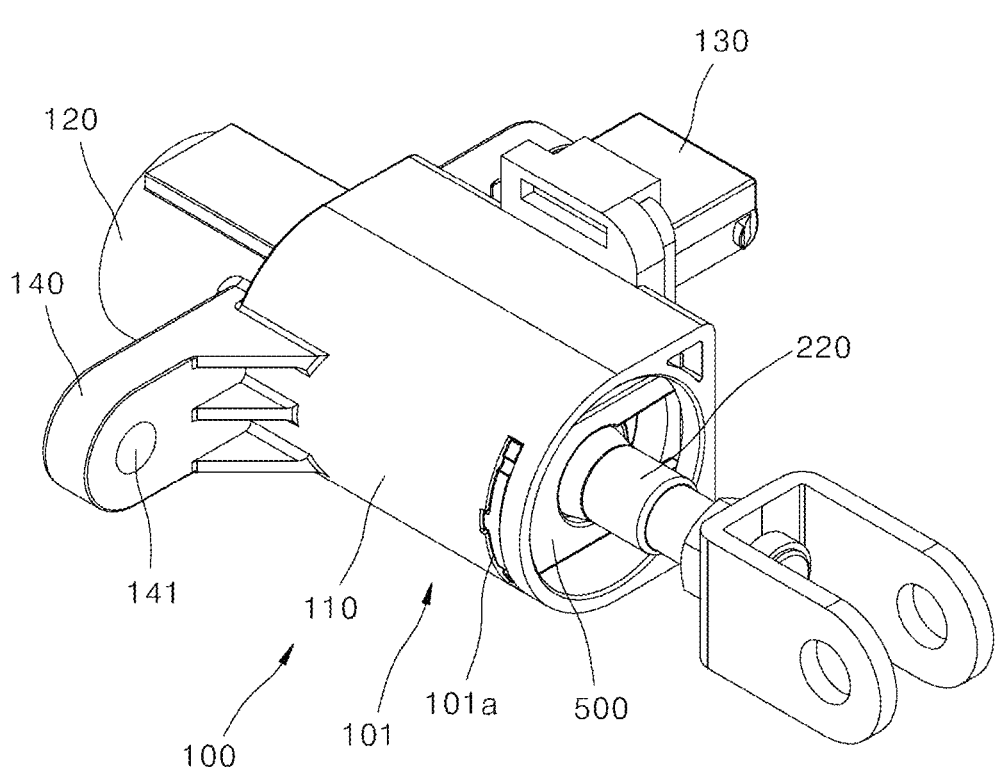
FIG. 3 is a perspective view illustrating the pedal simulator of a vehicle of FIG. 2 viewed from another direction.
Figure 4:
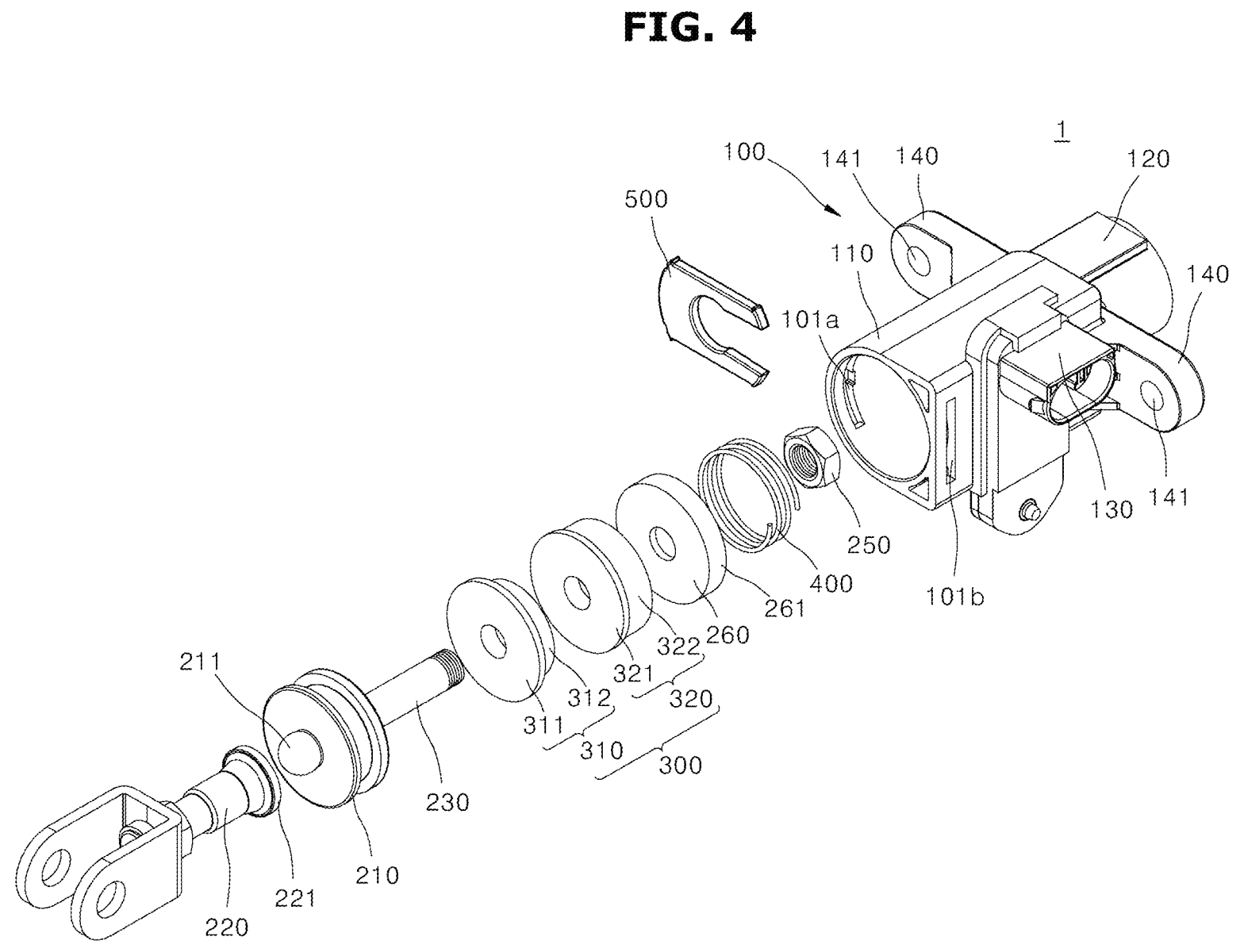
Figure 5:
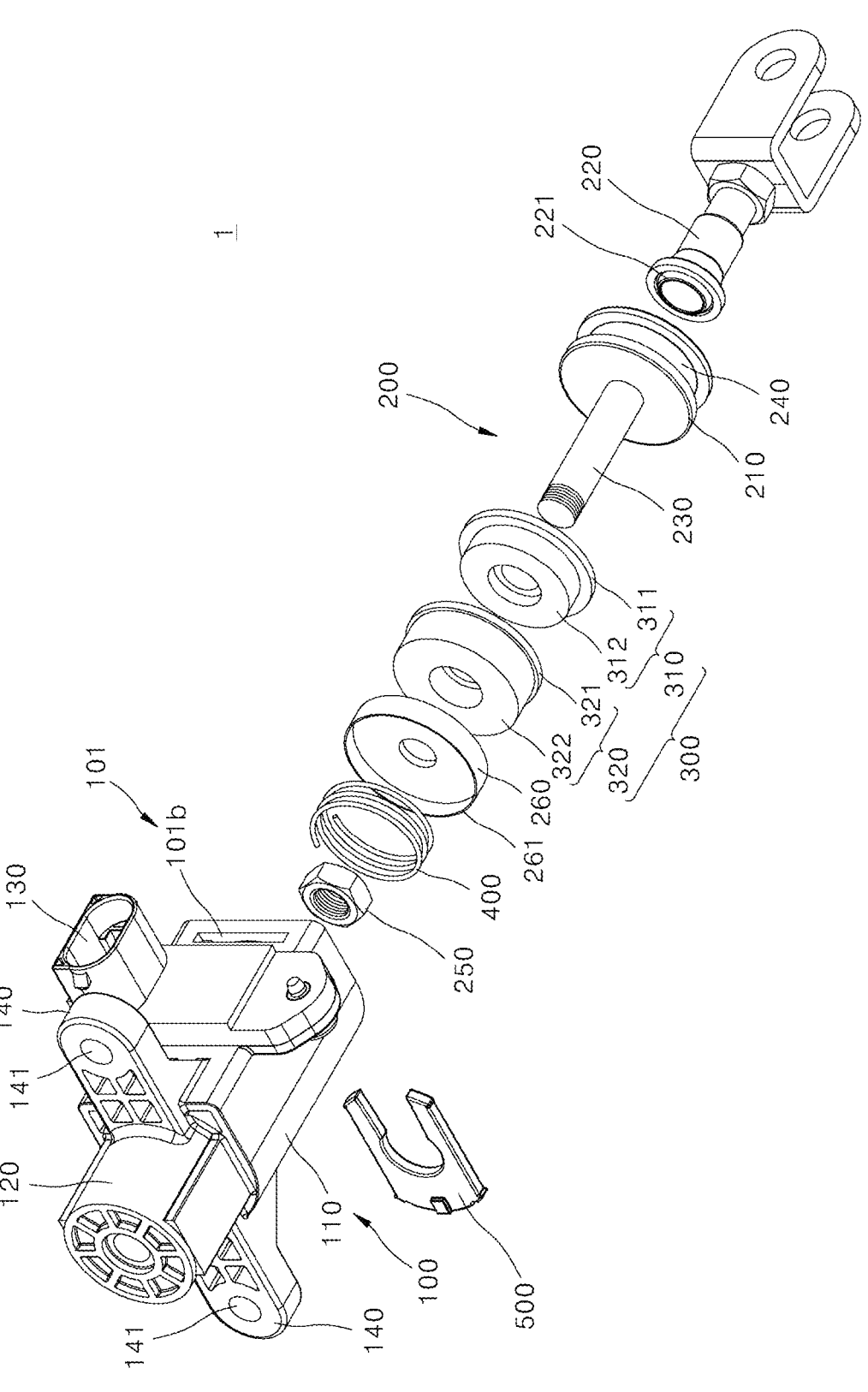
FIG. 5 is an exploded perspective view illustrating the pedal simulator of a vehicle of FIG. 4 viewed from another direction.
Figure 6:
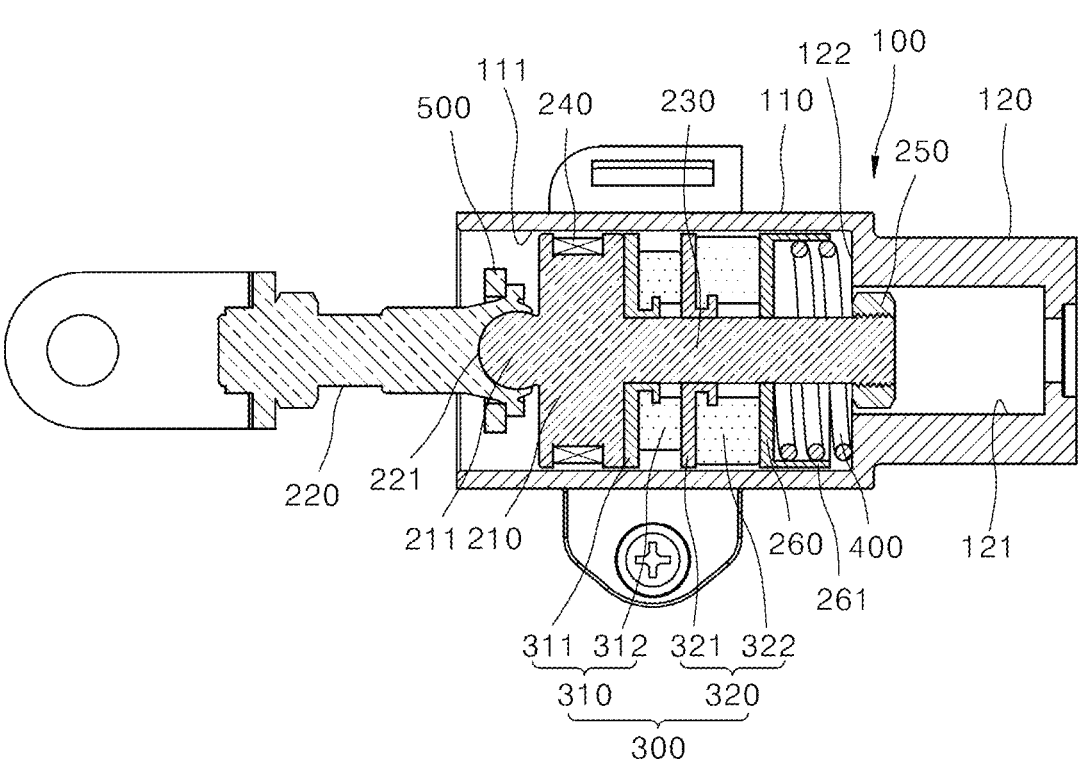
FIG. 6 is a side cross-sectional view illustrating the pedal simulator of a vehicle according to the embodiment of the present disclosure.

FIG. 2 is a perspective view illustrating the pedal simulator of a vehicle according to the embodiment of the present disclosure viewed from one direction, FIG. 3 is a perspective view illustrating the pedal simulator of a vehicle of FIG. 2 viewed from another direction, FIG. 4 is an exploded perspective view illustrating the pedal simulator of a vehicle according to the embodiment of the present disclosure viewed from one direction, FIG. 5 is an exploded perspective view illustrating the pedal simulator of a vehicle of FIG. 4 viewed from another direction, and FIG. 6 is a side cross-sectional view illustrating the pedal simulator of a vehicle according to the embodiment of the present disclosure.

Referring to FIGS. 2 to 6, the pedal simulator 1 of a vehicle according to the embodiment of the present disclosure includes a housing 100, a piston part 200, a damper part 300, and an elastic part 400, and a detailed description thereof will be made as follows.

The housing 100 forms the overall exterior of the pedal simulator of a vehicle according to the embodiment of the present disclosure and may support the piston part 200, the damper part 300, and the elastic part 400, which will be described below. The housing 100 may include a first housing 110 and a second housing 120.

The first housing 110 has a set length, and a first hollow 111 may be provided inside the first housing 110. That is, the first housing 110 may be formed in a hollow shape with a set length. The piston part 200 may be movably accommodated in the first hollow 111.

The first hollow 111 may guide a linear movement of a piston body 210 which will be described below. An opening communicating with the first hollow 111 may be provided on an outer surface of the first housing 110 (a left side of FIG. 6).

The second housing 120 may be provided on one side of a longitudinal direction of the first housing 110 (a right side of FIG. 6). The second housing 120 may be integrally provided in the first housing 110. The second housing 120 has a set length, and a second hollow 121 may be provided inside the second housing 120. That is, the second housing 120 may be formed in a hollow shape with a set length.

The second hollow 121 may communicate with the first hollow 111. A diameter of second hollow 121 may be formed to be smaller than a diameter of the first hollow 111. A piston rod 230, which will be described below, may be inserted into the second hollow 121. In addition, a nut 250, which will be described below, may be movably accommodated in the second hollow 121. Therefore, the second hollow 121 may guide a linear movement of the piston rod 230 to which the nut 250 is coupled.

A support 122 for supporting the elastic part 400 may be provided in the second housing 120. The support 122 may be formed to be stepped in a connection portion between the first housing 110 and the second housing 120. In other words, the support 122 may be formed to be bent inward the housing 100.

The elastic part 400 may be seated on the support 122. The support 122 may support the elastic part 400 so that the elastic part 400 is pressed by pressing of the piston part 200.

The housing 100 may be detachably connected to the pedal part 10, such as a pendant type pedal part or an organ type pedal part. The bracket 140 coupled to the pedal part 10 may be provided in the housing 100. The bracket 140 may be formed to protrude from the outer surface of the housing 100. A plurality of brackets 140 may be disposed in the housing 100 to be spaced apart from each other.

A hole 141 may be provided in the bracket 140. The hole 141 may be formed to pass through the bracket 140 in a thickness direction. The bracket 140 is connected to a coupling hole formed in the pedal part 10 by a coupling member 20 such as a bolt or a nut so that the housing 100 may maintain a stable connection state to the pedal part 10 and a rotation of the housing 100 may be prevented.

A sensor 130 may be further provided in the housing 100. The sensor 130 may be mounted on an outer surface of the first housing 110. The sensor 130 may be electrically connected to a vehicle controller (not shown) and may detect a position of a magnet 240 which will be described below.

The piston part 200 may be movably disposed in the housing 100. The piston part 200 may include a piston body 210, a piston pressing part 220, a piston rod 230, a nut 250, and a support plate 260.

The piston body 210 may be located inside the first housing 110. The piston body 210 may be accommodated in the first hollow 111. In other words, the piston body 210 may be movably accommodated in the first hollow 111.

The piston body 210 may be formed in a plate shape with a set thickness. A diameter of the piston body 210 may be formed to be greater than the diameter of the second hollow.

A ball 211 of a spherical shape may be provided in the piston body 210. The ball 211 may be formed to protrude from an outer surface of the piston body 210 facing the piston pressing part 220. The ball 211 may be formed at the center of the piston body. A socket 221 of the piston pressing part 220 may be connected to the ball 211.

The piston pressing part 220 may be disposed on one side of the piston body 210 (a left side of FIG. 6). The piston pressing part 220 may be mounted on the piston body 210. In other words, the piston pressing part 220 may be mounted on the ball 211.

The piston pressing part 220 may be exposed through an opening of the housing 100. The piston pressing part 220 may move toward one direction (a right direction of FIG. 6) when an external force is applied.

The piston pressing part 220 may be rotatably connected to the piston body 210 in a joint manner. In other words, the socket 221 provided in the piston pressing part 220 may be rotatably connected to the ball 211 provided in the piston body 210.

The piston body 210 can be caulking-coupled to the piston pressing part 220. For example, by pressing the opening of the socket 221 toward the piston body 210 and caulking the opening, the piston pressing part 220, which is moved by an external force, may maintain a state in which the piston pressing part 220 is rotatably connected to the ball 211. The piston body 210 may be caulked into the piston pressing part 220 to reduce an assembly time and costs.

The piston rod 230 may be disposed on the other side of the piston body 210 (a right side of FIG. 6). In other words, the piston rod 230 may be formed on the outer surface of the piston body 210 facing a direction in which the second housing 120 is located.

The piston rod 230 may be extended to a set length from the center of the piston body 210 toward the direction in which the second housing 120 is located. The piston rod 230 may be formed in a rod shape of which a transverse cross section is a circular shape. A diameter of the piston rod 230 may be formed to be smaller than the diameter of the piston body 210.

The diameter of the piston rod 230 may be formed to be smaller than the diameter of second hollow 121. The piston rod 230 may be movably accommodated in the first hollow 111 and the second hollow 121.

A plurality of damper parts 300 may be mounted on the piston rod 230. The piston rod 230 may pass through the plurality of damper parts 300.

A spiral thread may be formed at an end portion of the piston rod 230 facing the direction in which the second housing 120 is located. The spiral thread may be formed on an outer circumferential surface of the piston rod 230. The nut 250 may be coupled to the end portion of the piston rod 230.

The magnet 240 may be provided in the piston part 200. The magnet 240 may be provided on an outer circumferential surface of the piston body 210. The magnet 240 may be insert-injection molded with the piston body 210 to be integrally provided in the piston body 210.

The magnet 240 may be formed in a circumferential direction of the piston body 210. Therefore, a position of the magnet 240 may be detected regardless of a mounting position of the sensor 130 mounted on the housing 100.

The magnet 240 may measure position information of the piston part 200. The magnet 240 is a magnet having a magnetic force and as being moved together with the piston part 200, the magnet 240 may transmit a pedal effort applied by the piston part 200 or the position information of the piston part 200 through a change in magnetic field to the vehicle controller through the sensor 130.

The nut 250 may be spirally connected to the end portion of the piston rod 230. The nut 250 may be coupled to the piston rod 230 and may prevent the plurality of damper parts 300 mounted on the piston rod 230 from being separated in an axial direction of the piston rod 230. The nut 250 may be movably accommodated in the first hollow 111.

The support plate 260 may be formed in a plate shape with an opening provided in the center thereof to allow the piston rod 230 to pass therethrough. The support plate 260 may be mounted on the piston rod 230. The support plate 260 may be disposed between the plurality of damper parts 300 and the nut 250. The elastic part 400 seated on the support 122 may elastically support the support plate 260.

A protrusion 261 may be provided on the support plate 260. The protrusion 261 may be formed on an outer surface of the support plate 260 facing a direction in which the elastic part 400 is located. The protrusion 261 may extend from an edge of the support plate 260 to a set length and be formed in a circumferential direction of the support plate 260.

The protrusion 261 may be formed in a hollow shape of which inside is empty. An inner diameter of the protrusion 261 may be formed to be greater than an outer diameter of the elastic part 400. Thus, when the support plate 260 is moved toward the elastic part 400 by pressing of the piston part 200 and then the elastic part 400 is pressed, the elastic part 400 may be accommodated inside the protrusion 261. The protrusion 261 may be in contact or out of contact with the support 122 according to the movement of the piston part 200.

The damper part 300 may be mounted on the piston part 200. The damper part 300 may be provided as a plurality of damper parts 300. The plurality of damper parts 300 may be mounted on the piston rod 230. The plurality of damper parts 300 may be stacked in the axial direction of the piston rod 230 in the form of passing through the piston rod 230 to surround the piston rod 230.

The plurality of damper parts 300 may be disposed between the piston body 210 and the support plate 260.

The plurality of damper parts 300 may each be formed in a hollow shape of which inside is empty. An opening communicating with an internal space of the damper part 300 may be provided on both end portions of the damper part 300. The opening may be formed in the center of the damper part 300. Therefore, the piston rod may pass through the center of the damper part 300.

The plurality of damper parts 300 may be moved together with the piston part 200 and elastically deformed according to the movement of the piston part 200. When the protrusion 261 of the support plate 260 is supported by the support 122 in a movement direction of the piston part 200, the plurality of damper parts 300 may be pressed between the piston body 210 and the support plate 260.

When the piston body 210 is moved toward the second housing 120 by an external force applied to the piston pressing part 220, the piston rod 230 may be inserted into the second hollow 121 and the protrusion 261 of the support plate 260 may supported by the support 122 so that the damper part 300 may be pressed between the piston body 210 and the support plate 260.

Figure 7:
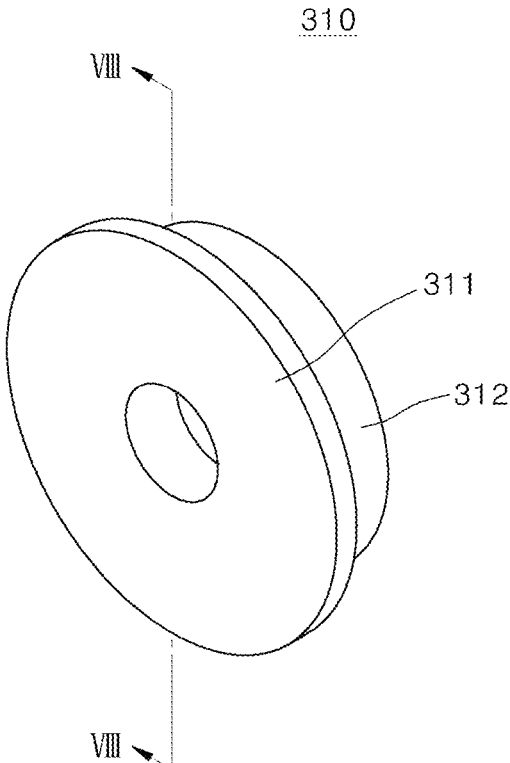
FIG. 7 is a perspective view illustrating a first damper part in the pedal simulator of a vehicle according to the embodiment of the present disclosure.
Figure 8:
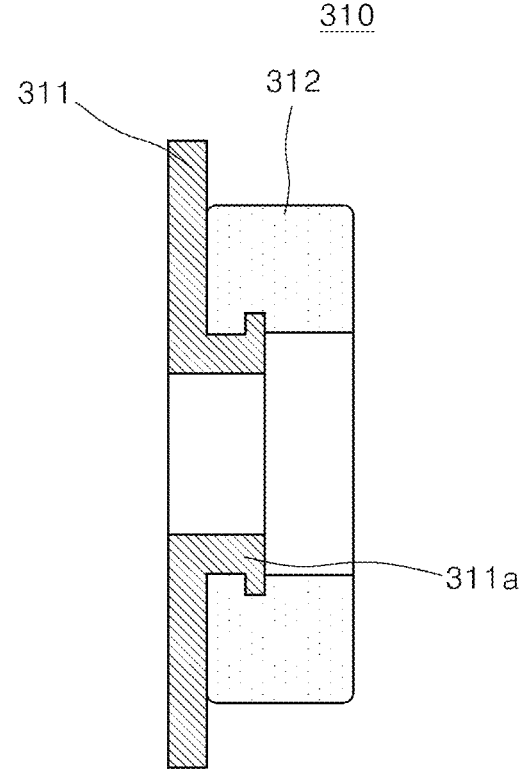
FIG. 8 is a side cross-sectional view of FIG. 7.
Figure 9:
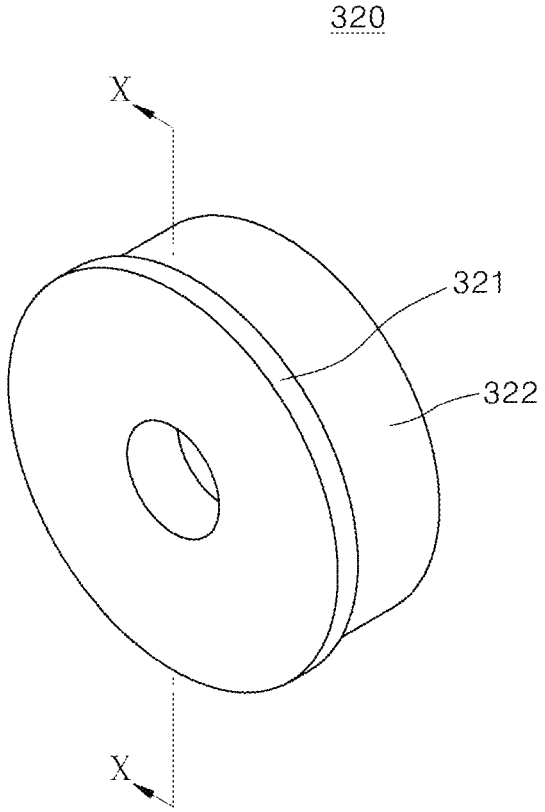
FIG. 9 is a perspective view illustrating a second damper part in the pedal simulator of a vehicle according to the embodiment of the present disclosure.
Figure 10:
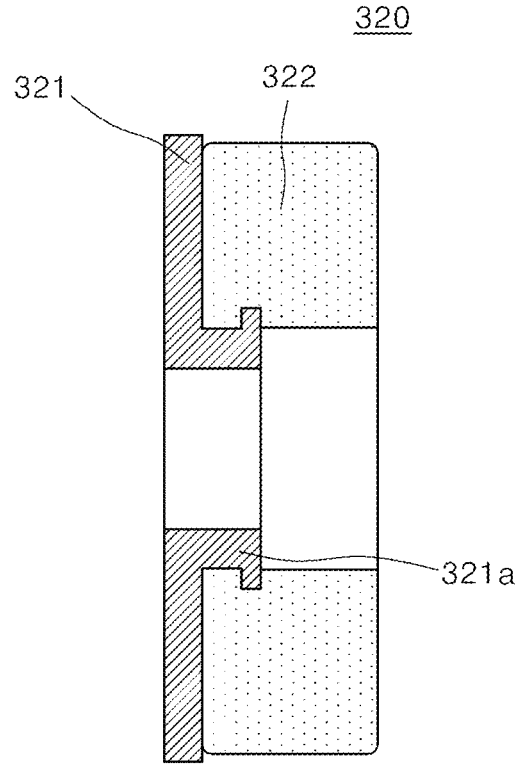
FIG. 10 is a side cross-sectional view of FIG. 9.

FIG. 7 is a perspective view illustrating a first damper part in the pedal simulator of a vehicle according to the embodiment of the present disclosure, FIG. 8 is a side cross-sectional view of FIG. 7, FIG. 9 is a perspective view illustrating a second damper part in the pedal simulator of a vehicle according to the embodiment of the present disclosure, and FIG. 10 is a side cross-sectional view of FIG. 9.

Referring to FIGS. 2 to 10, the damper part 300 according to the embodiment of the present disclosure may include a first damper part 310 and a second damper part 320. The first damper part 310 may include a first plate 311 and a first damper member 312.

The first plate 311 may be formed in a plate shape including a metal material. The first plate 311 may be in contact with the piston body 210. The first plate 311 may be pressed against the piston body 210. A first damper member 312 may be provided on the first plate 311.

The first damper member 312 may include an elastically deformable material. The first damper member 312 may include an elastically deformable material such as rubber, silicone, or plastic. The first damper member 312 may be provided integrally with the first plate 311. The first damper member 312 may be insert-injection molded into the first plate 311.

A first hook 311a may be provided in the first plate 311. The first hook 311a may be formed to protrude from an outer surface of the first plate 311 in contact with the first damper member 312.

The first hook 311a may protrude toward the first damper member 312 and be formed along an inner circumferential surface of the first plate 311, and an end portion may be bent to an inner circumferential surface of the first damper member 312 to be inserted into an inside of the first damper member 312. Therefore, the first damper member 312 may be hooked and fixed to the first hook 311a to be firmly fixed to the first plate 311.

The second damper part 320 may include a second plate 321 and a second damper member 322.

The second plate 321 may be formed in a plate shape including a metal material. The second plate 321 may be formed with a diameter and a thickness the same as those of the first plate 311. The second plate 321 may be in contact with the first damper member 312. The second plate 321 may be pressed against the first damper member 312. The second damper member 322 may be provided on the second plate 321.

The second damper member 322 may include an elastically deformable material. The second damper member 322 may include an elastically deformable material such as rubber, silicone, or plastic. The second damper member 322 may be integrally provided on the second plate 321. The second damper member 322 may be insert-injection molded into the second plate 321. The second damper member 322 may be in contact with the support plate 260. The support plate 260 may be pressed against the second damper member 322.

A second hook 321a may be provided in the second plate 321. The second hook 321a may be formed to protrude from an outer surface of the second plate 321 in contact with the second damper member 322.

The second hook 321a may protrude toward the second damper member 322 and be formed along an inner circumferential surface of the second plate 321, and an end portion may be bent to an inner circumferential surface of the second damper member 322 to be inserted into an inside of the second damper member 322. Therefore, the second damper member 322 may be hooked and fixed to the second hook 321a to be firmly fixed to the second plate 321.

The first damper member 312 and the second damper member 322 may have different diameters. A size of an outer diameter of the first damper member 312 may be formed to be smaller than a size of an outer diameter of the second damper member 322.

The first damper member 312 and the second damper member 322 may have different thicknesses. A thickness of the first damper member 312 may be formed to be smaller than a thickness of the second damper member 322.

The first damper member 312 and the second damper member 322 may have different hardnesses. For example, the first damper member 312 may be made of a soft material with a hardness that is lower than a hardness of the second damper member 322, or the second damper member 322 may be made of a soft material with the hardness that is lower than the hardness of the first damper member 312.

The elastic part 400 may elastically support the piston part 200 inside the first housing 110. In other words, the elastic part 400 may elastically support the piston part 200 in the first hollow 111.

One side of the elastic part 400 (the right side of FIG. 6) may be in contact with the support 122, and the other side thereof (the left side of FIG. 6) may be in contact with the outer surface of support plate 260. In other words, one side of the elastic part 400 may be seated on the support 122, and the other side thereof may be seated on the outer surface of the support plate 260. The elastic part 400 may provide an elastic force to the piston body 210 moved by an external force applied to the piston pressing part 220.

The elastic part 400 may be compressed between the support plate 260 and the support 122 by pressing of the piston body 210 moved by the external force applied to the piston pressing part 220.

The compressed elastic part 400 may provide an elastic force (elastic restoring force) to the piston body 210 to return the piston body 210 to its original position. The elastic part 400 may include a coil spring.

When the elastic part 400 is compressed, the plurality of damper parts 300 disposed between the piston body 210 and the support plate 260 are prevented from being compressed and deformed by the elastic force of the elastic part 400. In other words, the plurality of damper parts 300 are not compressed and deformed until the elastic part 400 reaches compression limit, and the plurality of damper parts 300 may be compressed and deformed after the protrusion 261 of the support plate 260 is supported on the support 122.

The pedal simulator 1 of a vehicle according to an embodiment of the present disclosure may further include a retainer 500.

A slit hole 101 may be provided in the housing 100. The slit hole 101 may be formed to pass through an outer circumferential surface of the first housing 110. The slit hole 101 may include a first slit hole 101a and a second slit hole 101b positioned on a side opposite to the first slit hole 101a.

The retainer 500 may be formed in a ring shape of which one end is open. The retainer 500 passes through the first slit hole 101a, a free end of the retainer 500 is inserted into the second slit hole 101b, and thus the retainer 500 may be coupled to the first housing 110.

The retainer 500 may prevent the piston part 200 from being separated in an axial direction through the opening in the first housing 110 by interfering with the piston pressing part 220.

An operation process of the pedal simulator of a vehicle according to the embodiment of the present disclosure, which is formed of the above-described configuration, will be described as follows.

Figure 11:
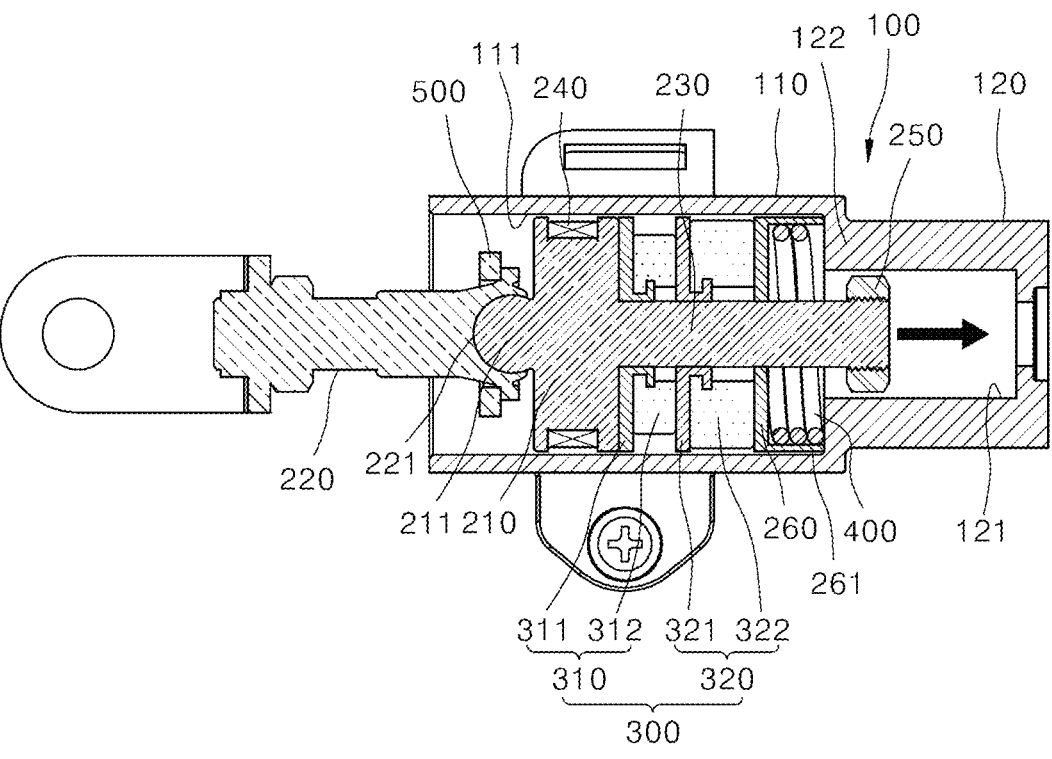
FIG. 11 is a cross-sectional view illustrating an operating state of initial braking of the pedal simulator of a vehicle according to the embodiment of the present disclosure.
Figure 12:
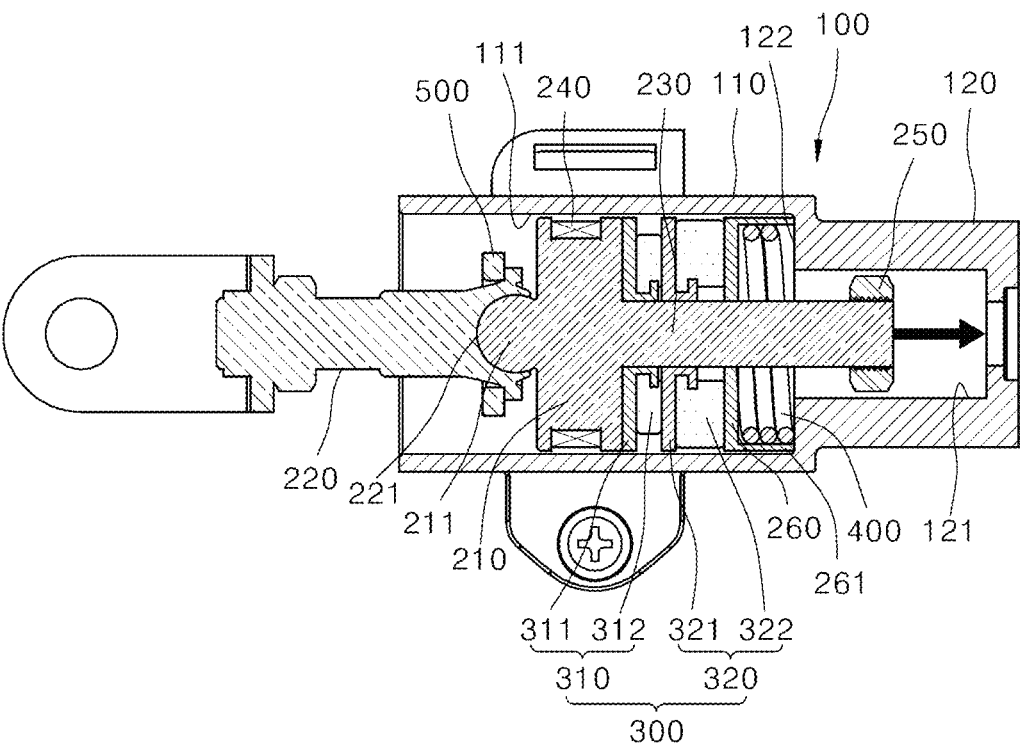
FIG. 12 is a cross-sectional view illustrating an operating state of mid- and late-braking of the pedal simulator of a vehicle according to the embodiment of the present disclosure.

FIG. 11 is a cross-sectional view illustrating an operating state of initial braking of the pedal simulator of a vehicle according to the embodiment of the present disclosure, and FIG. 12 is a cross-sectional view illustrating an operating state of mid- and late-braking of the pedal simulator of a vehicle according to the embodiment of the present disclosure.

Referring to FIG. 11, when the piston pressing part 220 is pressed by an external force, the piston rod 230 is moved toward the second housing 120 together with the piston body 210.

As the piston body 210 is moved, the elastic part 400 is compressed and deformed by pressing of the support plate 260, and the protrusion 261 of the support plate 260 comes into contact with the support 122. When the elastic part 400 is compressed, a user may feel an initial braking feel.

A position of the magnet 240 moved by the piston part 200 is detected by the sensor 130, and the sensor 130 transmits position information or pressure information of the piston part 200 according to a change in magnetic field to the vehicle controller.

Referring to FIG. 12, when an external force is continuously applied to the piston pressing part 220, the plurality of damper parts 300 moved together with the piston rod 230 are compressed between the piston body 210 and the support plate 260. When the plurality of damper parts 300 are compressed, the user may feel mid- and late-braking feels.

The position of the magnet 240 moved by the piston part 200 is detected by the sensor 130, and the sensor 130 transmits the position information or the pressure information of the piston part 200 according to the change in magnetic field to the vehicle controller.

When the external force applied to the piston pressing part 220 is released, the compressed elastic part 400 provides an elastic force (elastic restoring force) to the piston body 210 to return the piston body 210 to its original position.

The pedal simulator 1 of a vehicle according to the embodiment of the present disclosure may adjust a pedal effort by changing diameters, thicknesses, and hardnesses of the plurality of damper parts 300.

According to the pedal simulator 1 of a vehicle according to the embodiment of the present disclosure, commonization can be achieved for various types of pedal parts 10 through modularization capable of being applied regardless of the type and shape of the pedal part 10 so that repair and replacement costs of the pedal simulator 1 can be reduced and productivity can be improved.

According to the pedal simulator 1 of a vehicle according to the embodiment of the present disclosure, a pedal return spring can be omitted by the elastic part 400 elastically supporting the piston part 200.

According to the pedal simulator 1 of a vehicle according to the embodiment of the present disclosure, a pedal stroke can be measured by the magnet 240 integrally provided in the piston part 200.

According to the present disclosure, there is an effect capable of adjusting a pedal effort by changing diameters, thicknesses, and hardnesses of a plurality of damper parts.

While the present disclosure has been described with reference to the embodiments shown in the drawings, these embodiments are merely illustrative and it should be understood that various modifications and equivalent other embodiments can be derived by those skilled in the art on the basis of the embodiments. Accordingly, the true technical scope of the present disclosure should be determined by the appended claims.

What is claimed is:

1. A pedal simulator apparatus of a vehicle, the pedal simulator apparatus comprising:
   a housing;
   a piston part movably mounted in the housing;

a plurality of damper parts mounted on the piston part, stacked in an axial direction of the piston part, and supported and compressed by the housing and the piston part in response to a movement of the piston part; and
   an elastic part elastically supporting the piston part inside the housing,
   wherein the piston part includes:
      a piston body located inside the housing and including a ball;
      a piston pressing part disposed on a first side of the piston body and including a socket rotatably coupled to the ball; and
      a piston rod disposed on a second side of the piston body and passing through the plurality of damper parts.

2. The pedal simulator apparatus of claim 1, wherein the piston part further includes:
   a nut screw-coupled to an end portion of the piston rod; and
   a support plate through which the piston rod passes, the support plate disposed between the plurality of damper parts and the nut and supported by the elastic part.

3. The pedal simulator apparatus of claim 2, wherein the plurality of damper parts include:
   a first damper part including:
      a first plate in contact with the piston body; and
      a first damper member which is mounted on the first plate and elastically-deformable; and
   a second damper part including:
      a second plate in contact with the first damper member; and
      a second damper member which is mounted on the second plate, is in contact with the support plate, and is elastically-deformable.

4. The pedal simulator apparatus of claim 3, wherein the first damper member and the second damper member have different diameters, thicknesses, or hardnesses.

5. The pedal simulator apparatus of claim 3,
   wherein a first hook is formed to protrude from an outer surface of the first plate, is inserted into the first damper member, and hooks and fixes the first damper member, and
   wherein a second hook is formed to protrude from an outer surface of the second plate, is inserted into the second damper member, and hooks and fixes the second damper member.

6. The pedal simulator apparatus of claim 2, wherein the housing includes:
   a first housing including a first hollow in which the piston part is movably accommodated; and
   a second housing communicating with the first hollow, wherein the second housing includes:
      a second hollow into which the piston rod is inserted, and
      a support which supports the elastic part.

7. The pedal simulator apparatus of claim 6, wherein a diameter of the second hollow is smaller than a diameter of the first hollow.

8. The pedal simulator apparatus of claim 6, wherein the support plate includes a protrusion protruding from an outer surface of the support plate and configured to selectively contact with the support according to movement of the support plate.

9. The pedal simulator apparatus of claim 8, wherein the elastic part is mounted in the protrusion of the support plate.

10. The pedal simulator apparatus of claim 1, wherein each of the plurality of damper parts has different diameters, thicknesses, and hardnesses.

11. The pedal simulator apparatus of claim 1, further including at least a magnet mounted in the piston part.

12. A pedal simulator apparatus of a vehicle, the pedal simulator apparatus comprising:

a housing;

a piston part movably mounted in the housing;

a plurality of damper parts mounted on the piston part, stacked in an axial direction of the piston part, and supported and compressed by the housing and the piston part in response to a movement of the piston part;

an elastic part elastically supporting the piston part inside the housing; and a support plate through which a piston rod of the piston part passes, the support plate disposed between the plurality of damper parts and an end of the piston rod.

13. A pedal simulator apparatus of a vehicle, the pedal simulator apparatus comprising:

a housing detachably coupled to a pedal part;

a piston part movably mounted in the housing;

a plurality of damper parts mounted on the piston part, stacked in an axial direction of the piston part, and supported and compressed by the housing and the piston part in response to a movement of the piston part; and an elastic part elastically supporting the piston part inside the housing, wherein the piston part includes a piston rod, a first end portion engaged to the plurality of damper parts and a second end portion passing through the plurality of damper parts and slidably engaged to the housing.

14. The pedal simulator apparatus of claim 13, wherein each of the plurality of damper parts has different diameters, thicknesses, or hardnesses.

15. The pedal simulator apparatus of claim 13, further including a support plate through which the piston rod passes, the support plate disposed between the plurality of damper parts and an end of the piston rod.

16. The pedal simulator apparatus of claim 13, further including at least a magnet mounted in the piston part.

* * * * *